Figure 1:
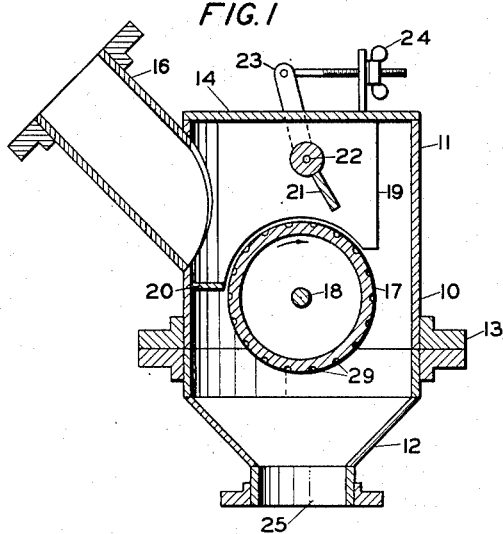

Feb. 16, 1954 — L. J. WEBER — 2,669,506

PEBBLE FEEDING APPARATUS

Filed Oct. 14, 1948

*INVENTOR.*
L. J. WEBER
BY Hudson & Young

ATTORNEYS

Patented Feb. 16, 1954

2,669,506

UNITED STATES PATENT OFFICE 2,669,506

PEBBLE FEEDING APPARATUS

Louis J. Weber, Bartlesville, Okla., assignor to Phillips Petroleum Company, a corporation of Delaware Application October 14, 1948, Serial No. 54,431

8 Claims. (Cl. 23—288)

This invention relates to a process and apparatus for controlling the rate of flow of pebbles through a pebble heater. In one of its more specific aspects it relates to a mechanism for variably controlling the rate of flow of pebbles through a pebble heater.

A relatively new type of apparatus for supplying heat for processes such as the manufacture of carbon monoxide-hydrogen synthesis gas, cracking of hydrocarbons, and super-heating of steam, is the pebble heater. This particular apparatus is constructed in such a manner that temperatures as high as 3500° F. may be obtained. Generally, such apparatus is constructed primarily of refractory bricks contained within an outer metal shell. The construction is such that a contiguous mass of pebbles may be passed downwardly countercurrent to the flow of hot gases and thereby have imparted to them the high temperature of the gases. In cracking organic materials at elevated temperatures, pebbles used to transmit the heat imparted to them from the hot gases must necessarily be of highly refractory character and ruggedness, because of the great stress imposed on them by rapid heating and cooling. In conducting endothermic reactions at elevated temperatures, it is necessary to operate with pebbles having in addition to the above characteristics, a relatively high specific heat in order to introduce sufficient heat with a minimum flow of pebbles.

The term "pebbles" as used herein refers to refractory elements which are employed herein as a fluent particulate mass. These pebbles are preferably substantially spherical and relatively uniform in size, but may be rod shaped or irregular in shape or size. Spheres of about ⅛ inch to 1 inch in diameter are suitable and those of ¼ inch to ½ inch are preferred. Care must be taken to select pebbles of proper composition for a given process. In cracking organic materials at elevated temperatures, pebbles of highly refractory character and ruggedness must be utilized. In conducting endothermic reactions at elevated temperatures, it is important to operate with pebbles of relatively high specific heat in order to introduce sufficient heat to the conversion chamber with a minimum flow of pebbles. Pure alumina pebbles fired at a temperature between 3000 and 3500° F. are suitable for many hydrocarbon conversion processes. Pebbles comprising beryllia, silicon carbide, mullite, periclase, and zirconia make excellent contact materials for some processes. Pebbles of the materials above named may be impregnated with other materials which are catalytic, but this treatment usually renders them less suitable at extremely high temperatures such as 2500° F. and higher. Metal balls such as nickel, Monel, inconel, iron, copper, etc., have utility in specific processes. Various adsorbent materials such as silica gel, active aluminas, activated carbon, etc., have wide utility in gas treatment and adsorption.

Pebbles which have been heated in a pebble heater as described above are passed therefrom to a suitable reaction zone where they may contact, for example, gases or vapors to be thermally cracked or where they may act as catalyst and heat transfer means for many other reactions. In all cases of such reactions, it is very desirable, if not necessary, to control the rate of flow of pebbles through the reaction zone so that the correct amount of heat is supplied.

It is quite obvious that not just any temperature would be satisfactory for a particular reaction or process, and that some means for controlling the flow of pebbles must be employed which will thereby control the temperature in the zone where the reaction takes place.

An object of my invention is to provide an apparatus for controlling the flow rate of a mass of hot pebbles.

Another object is to provide an apparatus for controlling the flow rate of a contiguous mass of pebbles in a gas-tight pressure-resistant system.

Another object is to provide an apparatus for controlling the flow of pebbles through a pebble heating apparatus.

Still another object is to provide an apparatus for controlling the flow rate of a contiguous mass of pebbles through a gas-tight pressure resistant system comprising a pebble heating apparatus and a reaction chamber integral therewith.

Further objects and advantages of this invention will be apparent to one skilled in the art from the accompanying disclosure and discussion.

I have invented an improved apparatus for controlling the flow of pebbles through a pebble heating apparatus and through a reaction chamber or heat transfer zone integral therewith. In particular, my invention pertains to a pebble flow controller, or as it is known in the art, a pebble feeder, utilizing a variable speed rotating multi-grooved drum as a means for regulating the flow of pebbles through the above mentioned apparatus.

Essentially my apparatus comprises a rotating drum containing grooves of specific size in relation to the size of the pebbles to be fed, a gate above said drum to roughly control the flow of pebbles over the drum, and a variable speed power means for rotating the drum at a desired speed. The above mentioned gate roughly regulates the flow of pebbles over the rotating drum by the distance at which its lower end is maintained from the surface of the drum. This distance may be adjusted manually by means of a thumb screw as shown in the accompanying drawings or by other equivalent means. The speed of the rotating drum hereinafter described more fully in conjunction with the drawings is adjusted by the power means used, such as a motor or turbine. Suitable means for actuating said power means are also hereinafter described. Fine adjustment of the speed of the power means is easily made automatic and it is this adjustment which is activated by the change in effluent specific gravity, pebble temperature, and the like.

The diameter of the rotating drum and the number of grooves therein will vary with the volume of pebbles to be handled. It is thought to be well within the skill of the art to determine these.

Figure 3:
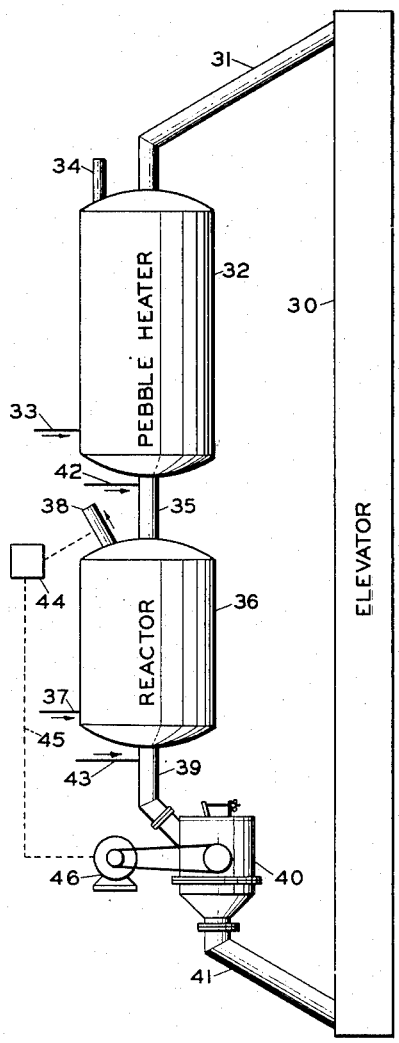
Figure 2:
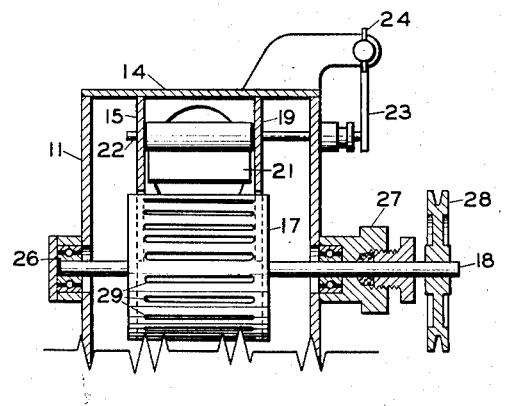
Figure 4:
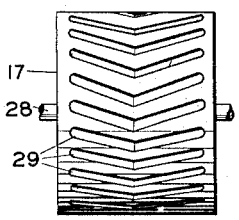

A further understanding of my invention may be had by referring to the attached drawings in conjunction with the following discussion. Figure 1 is a vertical cross-section of a preferred modification of my invention. Figure 2 is a cutaway front view of my apparatus, partly in cross-section. The rotating drum, adjustable gate, and gate adjustment, have been retained in this figure, not in cross-section, to make the construction of the mechanism more clear. Figure 3 is a flow diagram showing how my pebble feeder is utilized in conjunction with a pebble heater and a cooperating reaction zone, and Figure 4 is a front view of a second embodiment of drum 17 showing an alternate way of making grooves 29.

Refer now to Figure 1. Number 10 indicates a gas-tight pressure-resisting pebble feeder housing of preferably cylindrical design. The upper portion 11 of this housing is attached to the lower portion 12 thereof by means of flanges 13. Number 14 indicates a top closure member for said housing. Pebbles are introduced to said housing via conduit 16 attached to said housing at an angle of preferably 30 to 60 degrees from the horizontal, however, under some conditions it may be more desirable to place it in a vertical position so that it extends through the top 14 of said housing. Number 17 is a drum feeding device which may be rotated on horizontal shaft 18 in the direction of the arrow, said shaft extending through gas-tight fittings in the sides of said housing. Number 29 indicates grooves in drum 17 which aid in feeding the pebbles. Number 19 is a vertical plate positioned at right angles to the axis of drum 17 and extending over the outer edge thereof to direct the flow of pebbles over drum 17. Suitable clearance between plate 19 and drum 17 is one-half pebble diameter or less. Number 20 indicates a horizontal flange, the inner edge of which extends up to but does not touch drum 17, thus preventing pebbles from flowing downward between the housing and the rotating drum in the opposite direction to the rotation thereof. The ends of flange 20 extend to vertical plate 19 and plate 15 not shown thus forming a pebble receptacle zone from which pebbles may be removed only by passing over drum 17. It is desirable that the plane of flange 20 intersect horizontal drum 17 above its center line and preferably in the upper one-third of the drum diameter. Number 21 is an adjustable gate to aid in controlling the flow of pebbles over drum 17. Number 22 is a shaft to which gate 21 is rigidly attached which is rotated through an arc by lever arm 23 thus varying the distance between the lower edge of gate 21 and drum 17. Thumb screw 24 is supplied for adjusting the position of gate 21. It is preferable to have shaft 22 placed slightly to the right of a vertical plane through the axis of drum 17 and also to have it located above the top of the pebble inlet in housing 10. The length of gate 21 should be such that when completely depressed, it will barely touch the rotating drum, however, in normal operation the distance between these two is maintained at about two pebble diameters or more. Pebbles fed over drum 17 pass into the lower portion of the feeder housing 12 and through outlet 25.

Refer now to Figure 2. Apparatus elements in this drawing which are the same as those in Figure 1 are numbered similarly. Number 26 is a gas-tight bearing for one end of shaft 18. Number 27 indicates a gas-tight seal and a bearing within same for supporting the other end of said shaft. Number 28 is a V pulley which is utilized in supplying power to shaft 18 which rotates drum 17. Other suitable drive means such as a chain or gear-train will work satisfactorily. Motive power may be a variable speed motor or a turbine or other means which will give the desired speed or rotation to drum 17. Number 29 indicates longitudinal grooves on drum 17 which aid in feeding the pebbles from inlet 16 as shown in Figure 1 into outlet 25 of the same drawing. These grooves are preferably one-quarter to one pebble diameter in depth. The width of the grooves at the top should be at least one pebble diameter, and as the depth of the grooves approaches one pebble diameter, the width should approach about one and three quarter pebble diameters. These grooves do not function as pockets whereby the quantity of the pebbles handled would be a function of the pocket size, but act as a means for keying a few pebbles which in turn become keyed in with more pebbles, thus moving a considerably larger number of pebbles than could be retained in the grooves alone. It is preferable that grooves 29 do not extend to the outer edges of drum 17, but only to the inner edges of plates 15 and 19 thus eliminating the possibility of pebbles or fragments thereof being caught between the drum and the plates.

The grooves in the drum as just described may either run parallel to the axis of drum 17 or be in the form of a V, preferably with the apex pointing in the direction of rotation of the drum.

Refer now to Figure 3. Pebbles from elevator 30 are passed downwardly through conduit 31 to pebble heater 32. Combustible materials and air are introduced via line 33 to pebble heater 32 where they are burned to heat the pebbles therein. Exhaust gases are removed from the heater via flue 34. Conduit 35 is for transfer of heated pebbles from the pebble heater to reaction zone 36 where the pebbles supply the needed heat for reacting or merely heating fluid gases introduced via line 37. Number 38 indicates outlet means for reaction products. Conduit 39 connects reactor 36 with a pebble feeder of my invention, number 40. This feeder controls the rate of flow of a contiguous mass of pebbles from reactor 36 into conduit 41 and thus to elevator 30. Numbers 42 and 43 indicate two steam seals which are utilized to prevent intermixing of the gases from different zones. For example, steam seal 42 prevents gases from pebble heater 32 from passing into reactor 36 and diluting and contaminating the gases therein. Likewise, steam seal 43 prevents gases from reactor 36 from passing into the pebble feeder unit and on into the elevator. Number 44 is a recording-controlling gravitometer which, in cases of cracking and the like wherein the specific gravity of the effluent differs from that of the influent gases, measures and records the specific gravity of the effluent and when it changes from the desired value, actuates a control on the power means for the pebble feeder, increasing or decreasing the speed thereof and concomitantly changing the flow rate of the pebbles through the apparatus and thus the rate of heat input to the reactor. The gravitometer controls or regulates the speed of the power means so as to maintain a predetermined specific gravity through a pneumatic, hydraulic, or electrical system indicated as 45. Means other than the gravitometer shown in Figure 3 may be used for controlling or regulating the power means for the feeder such as temperature differential, temperature within the reactor, temperature of the flue gases from the pebble heater, temperature of the pebbles and the like. It is also feasible to use combinations of the above as control means for the feeder.

It is preferable in practically all cases to have a system which is substantially gas-tight and pressure-resistant, because often the pebble heater and the cooperating heat transfer zone are operated at slightly elevated pressure. The feeder and also the pebble elevator should also be gas-tight to prevent contamination through these portions of the system of the reactants in the heat transfer zone, and to prevent loss of reactants. Also if the system was not gas-tight air might leak in and unbalance the control of the temperature in the pebble heater.

My invention provides an apparatus which controls the flow of pebbles through a pebble heater and a cooperating reaction zone smoothly and evenly. The speed of same and thus the flow of pebbles therethrough is readily adjustable from the outside as shown in the drawings; and maintenance of my apparatus is quite easy because of the simple construction.

Although this invention has been described in terms of its preferred modifications, it is understood that various changes may be made without departing from the spirit and scope of the disclosure and of the claims.

I claim:

1. An apparatus to be used in conjunction with a pebble heating apparatus for controlling the flow of pebbles therethrough, which comprises a gas-tight pressure-resisting housing, pebble inlet means for introducing a contiguous mass of pebbles into said housing, a rotatable multi-grooved drum horizontally positioned within said housing and in the line of flow of pebbles introduced thereto, means for variable speed rotation of said drum and thereby causing controlled flow of pebbles from said inlet over said drum and into the bottom of said housing, side-plates for preventing the flow of pebbles over the upper outside edges of said drum, grooves in said drum terminating at a point within the inner edges of said side-plates, said grooves being of a depth in the range of ¼ to 1 pebble diameter and with a width in the range of 1 to 1¾ pebble diameters, an externally adjustable gate within said housing above said pebble inlet and said drum and parallel to said drum and between said side-plates, a shaft rigidly attached to said gate and supported at each end by said side-plates, said shaft being horizontally positioned to one side of a vertical plane passing through the center of rotation of said drum and in the direction of rotation of said drum, means for rotating said shaft from a position whereby said gate hangs in a vertical position touching said drum to a horizontal position whereby said gate extends from said shaft in the direction of rotation of said drum, restrictive means within said housing for preventing the flow of pebbles through said housing countercurrent to the rotation of said drum, said restrictive means being so placed that its plane intersects said drum above a horizontal plane through the center of rotation of said drum, and means for removing pebbles from the bottom of said housing.

2. An apparatus according to claim 1 wherein the plane of said restrictive means intersects said drum and a horizontal plane passing through the upper third of a vertical diameter of said drum.

3. An apparatus according to claim 1 wherein the center line of said pebble inlet forms an angle in the range of 30 to 60 degrees with the horizontal.

4. An apparatus according to claim 1 wherein the grooves in said drum are in the shape of a V the apex of which points in the direction of rotation of said drum.

5. An apparatus to be used in conjunction with a pebble heating apparatus for controlling the flow of pebbles therethrough, which comprises a gas-tight pressure-resisting housing, pebble inlet means for introducing a contiguous mass of pebbles into said housing, said pebble inlet means forming an angle in the range of 30 to 60° with the horizontal, a rotatable multi-grooved drum horizontally positioned within said housing and in the line of flow of pebbles introduced thereto, shaft means extending through said drum for rotating same extending through said housing, bearing means for said shaft and gas-tight means therearound, means for variable speed rotation of said drum and thereby causing controlled flow of pebbles from said inlet over said drum into the bottom of said housing, side-plates positioned one-half a pebble diameter or less above the outer edge of said drum for preventing the flow of pebbles over the outer edges of said drum, grooves in said drum terminating at a point within the inner edges of said side-plates of a depth in the range of ¼ to 1 pebble diameter and a width in the range of 1 to 1¾ pebble diameters, an externally adjustable gate within said housing above said pebble inlet and said drum and parallel to said drum and between said side-plates, a shaft rigidly attached to said gate and supported at each end by said side-plates, said shaft being horizontally positioned to one side of a vertical plane passing through the center of rotation of said drum and in the direction of rotation of said drum, means for rotating said shaft from a position whereby said gate hangs in a vertical position touching said drum to a horizontal position whereby said gate extends from said shaft in the direction of rotation of said drum, restrictive means within said housing for preventing the flow of pebbles through said housing countercurrent to the rotation of said drum, said restrictive means being so placed that its plane intersects said drum above a horizontal plane through the center of rotation of said drum, and means for removing pebbles from the bottom of said housing.

6. An apparatus to be used in conjunction with a pebble heater apparatus for controlling the flow of pebbles therethrough, which comprises a gas-tight pressure-resisting housing, means for introducing a contiguous mass of pebbles into said housing, a rotatable multi-grooved drum horizontally positioned within said housing and in the line of flow of pebbles introduced thereto, means for variable speed rotation of said drum, thereby causing controlled flow of pebbles from said inlet over said drum and into the bottom of said housing, side plates for preventing the flow of pebbles over the upper outside edges of said drum, grooves in said drum terminating at a point within the inner edges of said side plates, an externally adjustable gate within said housing positioned above and parallel to said drum and between said side plates for further controlling the flow of pebbles, said adjustable gate being rigidly attached to a shaft supported at each end of said side plates above the top of said pebble inlet, said shaft being horizontally positioned to one side of a vertical plane passing through the center of rotation of said drum and in the direction of rotation of said drum, means for rotating said shaft from a position whereby said gate hangs vertically touching said drum to a horizontal portion whereby said gate extends from said shaft in the direction of rotation of said drum, means within said housing for preventing the flow of pebbles through said housing countercurrent to the rotation of said drum, and means for removing pebbles from the bottom of said housing.

7. A pebble heating apparatus comprising a reactor, a pebble heater in gas tight connection therewith for introducing heated pebbles into said reactor, an apparatus connecting the reactor with the pebble heater for controlling the flow of pebbles through said heating apparatus which comprises a gas-tight pressure-resisting housing, means for introducing a contiguous mass of pebbles into said housing from a reactor, a rotatable multi-grooved drum horizontally positioned within said housing and in the line of flow of pebbles introduced thereto, side-plates for preventing the flow of pebbles over the upper outside edges of said drum, an adjustable gate within said housing positioned above and parallel to said drum and between said side-plates for further controlling the flow of pebbles, means within said housing for preventing the flow of pebbles through said housing countercurrent to the rotation of said drum, means for conveying pebbles from the apparatus for controlling the flow of pebbles to the pebble heater and means for varying the speed of rotation of said drum automatically in response to changes in reaction conditions in said reactor, and thereby causing controlled rate of flow of pebbles from said inlet over said drum and into the bottom of said housing.

8. An apparatus to be used in conjunction with a pebble heating apparatus for controlling the flow of pebbles therethrough, which comprises a gas-tight pressure-resisting housing, means for introducing a contiguous mass of pebbles into said housing, a rotatable multi-grooved drum horizontally positioned within said housing and in the line of flow of pebbles introduced thereto, means for varying the speed of rotation of said drum automatically in response to changes in reaction conditions in a reactor, and thereby causing controlled rate of flow of pebbles from said inlet over said drum and into the bottom of said housing, side-plates for preventing the flow of pebbles over the upper outside edges of said drum, an adjustable gate within said housing positioned above and parallel to said drum and between said side-plates for further controlling the flow of pebbles, means within said housing for preventing the flow of pebbles through said housing countercurrent to the rotation of said drum, and means for removing pebbles from the bottom of said housing.

LOUIS J. WEBER.

References Cited in the file of this patent

UNITED STATES PATENTS

| Number | Name | Date |
| --- | --- | --- |
| 429,857 | Loftus et al. | June 10, 1890 |
| 533,252 | Thomas | Jan. 29, 1895 |
| 783,186 | Ericsson | Feb. 21, 1905 |
| 1,482,812 | Roberts | Feb. 5, 1924 |
| 2,317,274 | Johnson | Apr. 20, 1943 |
| 2,317,838 | West et al. | Apr. 27, 1943 |
| 2,326,005 | Bradley | Aug. 3, 1943 |